United States Patent [19]

Itoh

[11] Patent Number: 4,729,122
[45] Date of Patent: Mar. 1, 1988

[54] MAGNETO-OPTICAL REPRODUCING HEAD OF A HIGH LIGHT UTILIZATION RATE

[75] Inventor: Masataka Itoh, Tokyo, Japan

[73] Assignee: NEC Corporation, Tokyo, Japan

[21] Appl. No.: 788,310

[22] Filed: Oct. 17, 1985

[30] Foreign Application Priority Data

Oct. 22, 1984 [JP] Japan .................... 59-221723

[51] Int. Cl.$^4$ ............................................ G11B 11/00
[52] U.S. Cl. ........................................ 369/13; 369/44; 369/110; 360/114
[58] Field of Search .................... 369/13, 44, 110; 350/375–376, 378, 380, 401; 360/114, 59; 365/122

[56] References Cited

U.S. PATENT DOCUMENTS

| | | | |
|---|---|---|---|
| 3,927,946 | 12/1975 | McClure | 350/376 X |
| 4,136,362 | 1/1979 | Naruse | 369/110 X |
| 4,253,733 | 3/1981 | Krasinski et al. | 350/380 |
| 4,272,159 | 6/1981 | Matsumoto | 350/401 X |
| 4,409,631 | 10/1983 | Matsumoto | 360/114 |
| 4,410,277 | 10/1983 | Yamamoto et al. | 360/114 X |
| 4,558,440 | 12/1985 | Tomita | 369/110 X |
| 4,561,032 | 12/1985 | Matsumoto et al. | 369/110 X |
| 4,638,470 | 1/1987 | Connell et al. | 360/114 X |
| 4,656,433 | 4/1987 | Franklin et al. | 350/401 X |

Primary Examiner—Raymond F. Cardillo
Assistant Examiner—Wayne R. Young
Attorney, Agent, or Firm—Sughrue, Mion, Zinn, Macpeak, and Seas

[57] ABSTRACT

In a magneto-optical reproducing head including first and second beam splitters (21, 22) and a Faraday effect member (25) between the splitters to suppress return to a laser beam source (11) of a reversed laser beam reversedly sent from a magneto-optical recording medium (12) on which a forward laser beam is incident, the second beam splitter is made to have a transmissivity of at least 0.5 for a p-polarized component. For an s-polarized component, the second beam splitter has a reflectivity which is substantially equal to unity as usual. In order to produce a servo control signal, a signal producing circuit (17) is made to receive an s-polarized component which is substantially totally reflected in the first beam splitter and into which the Faraday effect member converts the p-polarized component having reversedly passed through the second beam splitter. The transmissivity of the second beam splitter should preferably be at least 0.75 and not greater than 0.8. An optically active member (35) is preferably interposed between the Faraday effect member and either the first or the second beam splitter. The head is readily used in recording information on the recording medium and/or in erasing such information.

6 Claims, 5 Drawing Figures

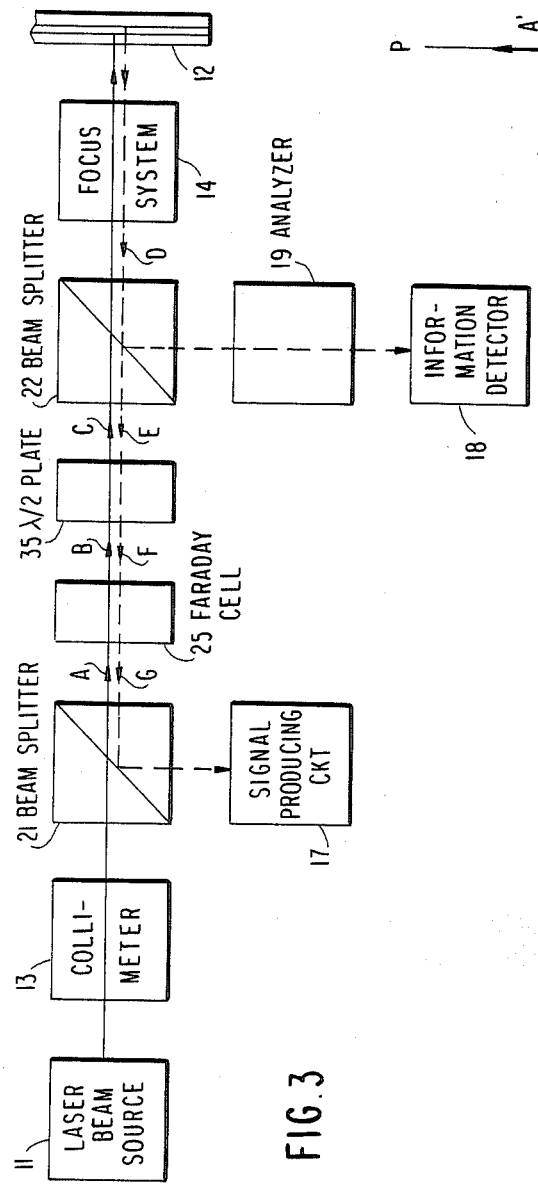
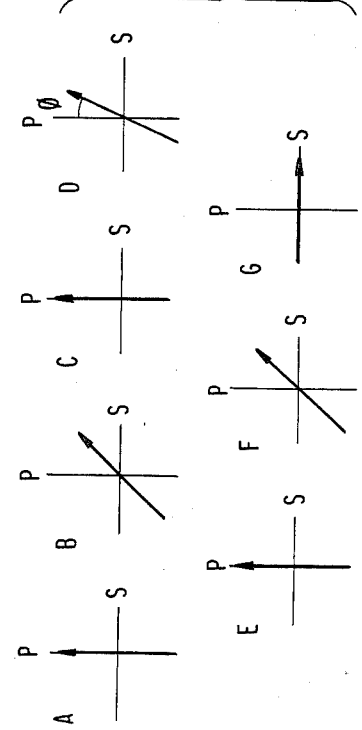
FIG. 3
FIG. 4
FIG. 5

MAGNETO-OPTICAL REPRODUCING HEAD OF A HIGH LIGHT UTILIZATION RATE

BACKGROUND OF THE INVENTION

This invention relates to a magneto-optical head for use in a magneto-optical reproducing device as a magneto-optical reproducing head. In the manner known in the art, it is possible to use such a head also as a magneto-optical recording and/or erasing head.

A magneto-optical recording and/or erasing device is used in recording information on a magneto-optical recording medium and/or in erasing the information for again recording new information where the information is previously erased. A magneto-optical reproducing device is used in reproducing the information. In the reproducing device, the magneto-optical reproducing head is used in combination with a laser beam source and a magneto-optical recording medium on which information is already recorded. The reproducing device is readily used also as a magneto-optical recording and/or erasing device.

Conventional magneto-optical recording and reproducing heads are described in an article contributed by Toshihisa Deguchi et al to Applied Optics, Volume 23, No. 22 (Nov. 15, 1984), pages 3972 to 3978, under the title of "Digital Magneto-optic Disk Drive" and in another article which is contributed by Masahiro Ojima et al to SPIE, Volume 529 (Optical Mass Data Storage, 1985), pages 12 to 18, and entitled "Magneto-optical Disk for Coded Data Storage." In the manner which will later be described more in detail, it is impossible with such a conventional head to avoid return to the laser beam source of a portion of a laser beam which is generated by the laser beam source and reflected from the recording medium. This gives rise to various problems.

An improved magneto-optical recording and reproducing head is disclosed in Japanese Patent Prepublication (Kôkai) No. 66,537 of 1982. In the manner which will also be described in the following, the improved head comprises a first and a second beam splitter along a light path and a first arrangement for causing a forward laser beam to forwardly proceed along the light path from the laser beam source to the recording medium. When the improved head is used as a reproducing head, the recording medium responds to the forward laser beam incident thereon to produce a reversed laser beam which varies with the information recorded on the recording medium. The reversed laser beam comprises an information and an orthogonal component having polarization planes perperdicular and parallel to a polarization plane which the forward laser beam has at a point of incidence to the recording medium, respectively. The first arrangement is for furthermore causing the reversed laser beam to reversedly proceed partly along the light path from the recording medium.

The first beam splitter has a first transmissivity for a first p-polarized component, substantially totally reflects a first s-polarized component, and is azimuthally oriented as regards the light path to make the forward laser beam forwardly pass therethrough as the first p-polarized component. The second beam splitter has a second transmissivity for a second p-polarized component and substantially totally reflects a second s-polarized component. Like in the conventional head, the second beam splitter may azimuthally be oriented with respect to the light path to reflect the information component as the second s-polarized component and to make the orthogonal component reversedly pass threrethrough as the second p-polarized component.

In the improved head, a Faraday effect member is interposed between the first and the second beam splitters and used as a second arrangement for giving a 90° difference between polarization planes of the forward laser beam forwardly incident thereon through the first beam splitter and of the reversed laser beam reversedly passed therethrough after having reversedly passed through the second beam splitter. Having forwardly passed through the first beam splitter and subsequently the second arrangement, the forward laser beam is made to forwardly pass through the second beam splitter as the second p-polarized component. Having reversedly passed through the second beam splitter and thereafter the second arrangement, the reversed laser beam is made to reversedly enter the first beam splitter as the first s-polarized component. As in the conventional head, an information detector may detect the information in response to the reversed laser beam reflected in the second beam splitter.

The improved head is capable of suppressing that portion of the reversed laser beam which will otherwise return to the laser beam source. It is described in the prepublication that the head has an excellent signal-to-noise ratio. The improved head, however, has a meager light utilization rate because the second transmissivity should be equal to 0.5 if the information detector is coupled to the second beam splitter as in the conventional head. When a signal producing circuit is made to produce a control signal in response to the reversed laser beam reflected in the second beam splitter like in the conventional head, the control signal is not sufficiently strong for use in servo controlling the reproducing device.

SUMMARY OF THE INVENTION

It is therefore an object of the present invention to provide a magneto-optical reproducing head for use in a magneto-optical reproducing device together with a laser beam source and a magneto-optical recording medium, in which it is possible to suppress return to the laser beam source of a laser beam which is generated by the laser beam source and reversedly sent from the recording medium.

It is another object of this invention to provide a head of the type described, which is capable of reproducing, with a high signal-to-noise ratio, information recorded on the recording medium.

It is still another object of this invention to provide a head of the type described, which has a high light utilization rate.

It is yet another object of this invention to provide a head of the type described, in which it is possible to produce a sufficiently strong control signal for use in servo controlling the reproducing device.

Other objects of this invention will become clear as the description proceeds.

It is possible on describing this invention to define a magneto-optical reproducing head as follows. The head is for use in a magneto-optical reproducing device together with a laser beam source and a magneto-optical recording medium and includes a first and a second beam splitter along a light path and first means for causing a forward laser beam to forwardly proceed along the light path from the laser beam source to the recording medium and for causing a reversed laser beam to reversedly proceed partly along the light path from the recording medium. The reversed laser beam comprises an information and an orthogonal component having polarization planes perpendicular and parallel to a polarization plane which the forward laser beam has at the recording medium, respectively. The first beam splitter has a first transmissivity for a first p-polarized component, substantially totally reflects a first s-polarized component, and is oriented to make the forward laser beam pass therethrough as the first p-polarized component. The second beam splitter has a second transmissivity for a second p-polarized component, substantially totally reflects a second s-polarized component, and is oriented to reflect the information component as the second s-polarized component and to make the orthogonal component reversedly pass therethrough as the second p-polarized component. The first transmissivity is substantially equal to unity. The head further includes information detecting means responsive to the information component reflected in the second beam splitter for detecting information recorded on the recording medium and second means between the first and the second beam splitters for giving a 90° difference between polarization planes of the forward laser beam incident thereon and of the orthogonal component having reversedly passed therethrough to make the forward laser beam forwardly pass through the second beam splitter as the second p-polarized component and to make the orthogonal component reversedly enter the first beam splitter as the first s-polarized component.

According to this invention, the second transsissivity of the second beam splitter used in the above-defined head, is greater than 0.5. The above-defined head comprises signal producing means responsive to the orthogonal component reflected in the first beam splitter for producing a control signal for use in servo controlling the magneto-optical reproducing device.

BRIEF DESCRIPTION OF THE DRAWING

FIG. 3 shows a schematic side view of a magneto-optical reproducing head according to an embodiment of the instant invention together with a laser beam source and a magneto-optical recording medium;

FIG. 4 schematically shows polarization planes which a forward and a reversed laser beam have here and there in the head depicted in FIG. 3; and FIG. 5 schematically shows information and orthogonal components of a reversed laser beam at a few points in the head illustrated in FIG. 1, together with a forward laser beam incident on the recording medium.

DESCRIPTION OF THE PREFERRED EMBODIMENTS

Figure 1:
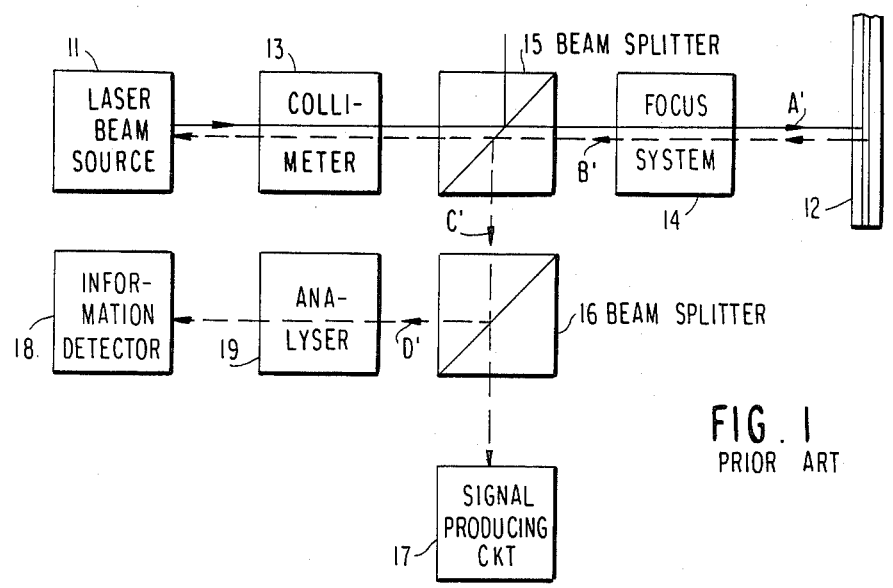
FIG. 1 shows a schematic side view of a conventional magneto-optical reprocing head together with a laser beam source and a magneto-optical recording medium.

Referring to FIG. 1, a conventional magneto-optical reproducing head will be described at first in order to facilitate an understanding of the present invention. The head is of the type described in the above-cited Deguchi et al and Ojima et al articles and is for use in a magneto-optical reproducing device together with a laser beam source 11 and a magneto-optical recording medium 12 on which information is already recorded.

The head comprises a collimeter system 13 and a focussing system 14 for causing a laser beam to forwardly proceed along a trunk light or beam path from the laser beam source 11 to the recording medium 12 as a forward laser beam depicted by a solid line. The collimeter system 13 is for making the forward laser beam proceed to the focussing system 14 as a parallel beam. The focussing system 14 is for focussing the forward laser beam on the recording medium 12 at a point of incidence which varies relative to the recording medium 12 in the manner known in the art. The light path is normal to the recording medium 12 at the point of incidence.

It is known in the art that the forward laser beam is a linearly or plane polarized beam. The forward laser beam will be surmised to have a polarization plane or plane of polarization which is directed in a certain azimuthal direction in a plane perpendicular to the trunk light path at the point of incidence. The recording medium 12 reflects the forward laser beam as a reversed or backward laser beam depicted by a dashed line which is drawn offset from the solid line merely for clarity of illustration. The focussing system 14 makes the reversed laser beam reversedly or backwardly proceed partly along the light path from the recording medium 12.

As a result of a magneto-optical effect of the recording medium 12, such as the Faraday effect or the magneto-optical Kerr effect, the reversed laser beam varies with the information recorded on the recording medium 12. Attention will be directed to a polarization plane which the reversed laser beam has. At the point of incidence, the polarization plane of the reversed laser beam forms an angle $\phi$ relative to the polarization plane of the forward laser beam. The reversed laser beam is therefore divisible into two beam components which have component polarization planes perpendicular and parallel to the polarization plane of the forward laser beam at the point of incidence and are referred to herein as an information and an orthogonal component, respectively. Inasmuch as the recording medium 12 usually comprises a layer of an amorphous magnetic material, such as an alloy of gadolinium and cobalt, gadolinium and iron, or terbium and iron, the angle $\phi$ will be called a Kerr rotation angle. At any rate, the angle $\phi$ is dependent on the information recorded in the recording medium 12. Incidentally, the point of incidence should be on the amorphous magnetic material layer and ordinarily has a diameter of about 1 micron.

A main beam splitter 15 is interposed between the collimeter and the focussing systems 13 and 14. In the manner known in the art, the beam splitter is a polarization beam splitter having a plane of a finite transmissivity for a p-polarized component which has electric lines of force or electric vectors parallel to a plane of incidence of a beam incident either forwardly or reversedly on the plane of the finite transmissivity. Such a plane of finite transmissivity will be called a splitting plane for convenience of reference. For an s-polarized component having electric lines of force perpendicular to the plane of incidence, the splitting plane has a reflectivity which is substantially equal to unity. It will be assumed that the beam splitter 15 is oriented azimuthally relative to the trunk light path so that the forward laser beam and the information component of the reversed laser beam are incident on the splitting plane as the p-polarized and the s-polarized components, respectively, and that the splitting plane is given an inclination of 45° with respect to the light path.

A portion of the forward laser beam therefore forwardly passes through the beam splitter 15 with the finite transmissivity to proceed substantially along the trunk light path as a continuation of the forward laser beam. Another portion of the forward laser beam entering the beam splitter 15 as the p-polarized component, is reflected at the splitting plane in compliance with a reflectivity which is equal to one minus the finite transissivity. The latter portion proceeds along a 90° deflected light path depicted by a short vertical solid line. Inasmuch as the forward laser beam enters the beam splitter 15 wholly as the p-polarized component, no other portion is reflected aside from the light path. The orthogonal component of the reversed laser beam is substantially totally reflected at the splitting plane to proceed along a branch light path which is orthogonal to the trunk light path. A portion of the information component reversedly passes through the beam splitter 15 with the finite transmissivity along the trunk light path. Another portion of the information component is reflected at the splitting plane in accordance with the finite transmissivity to proceed along the branch light path as an information portion. The orthogonal component and the information portion which proceed along the branch light path, will collectively be called a branch beam portion.

An auxiliary beam splitter 16 receives the branch beam portion from the main beam splitter 15. Like the main beam splitter 15, the auxiliary beam splitter 16 has a splitting plane of a finite transmissivity for the p-polarized component and a reflectivity of substantial unity for the s-polarized component. The splitting plane of the auxiliary beam splitter 16 is azimuthally oriented relative to the branch light path so that the orthogonal component and the information portion of the branch beam portion are incident thereon as the p-polarized and the s-polarized components, respectively, with the splitting plane given an inclination of 45° with respect to the branch light path. A part of the orthogonal component passes through the auxiliary beam splitter 16 with the finite transmissivity of the auxiliary beam splitter 16 to proceed along the branch light path as a branch beam part. The information portion is substantially totally reflected in the auxiliary beam splitter 16 to proceed along a twig light path which is parallel to the trunk light path. Another part of the orthogonal component is reflected in the auxiliary beam splitter 16 to proceed along the twig light path. The information portion and the latter part of the orthogonal component which proceed along the twig light path, will collectively be called a twig beam part.

Responsive to the branch beam part, a signal producing circuit 17 produces a control signal which is used in servo controlling the magneto-optical reproducing device in the known manner. The twig beam part is received by an information detector 18 through an analyser 19. The information detector 18 detects the information recorded on the recording medium 12. It is possible to understand that the information detector 18 is responsive to the information component which is reflected in the main beam splitter 15.

The finite transmissivities of the main and the auxiliary beam splitters 15 and 16 are approximately equal to 0.5 or 50%. Inasmuch as the orthogonal component is much stronger than the information component at the recording medium 12 because the Kerr rotation angle $\phi$ is ordinarily less than 1°, a considerable amount of the reversed laser beam returns to the laser beam source 11 reversedly along the trunk light path through the focussing system 14, the main beam splitter 15, and the collimeter system 13. This generates laser noise to render the output power of the laser beam source 11 unstable. This furthermore reduces the signal-to-noise ratio of the information detected by the information detector 18.

On the other hand, only a half of the forward laser beam forwardly passes through the main beam splitter 15 to be incident on the recording medium 12 through the focussing system 13. The head therefore has an objectionably low rate or factor of utilization of the laser beam generated by the laser beam source 11. This makes it inevitable to drive the laser beam source 11 at a high power. The laser beam source 11 is consequently overloaded to become liable to damage and to have a short serviceable life. The rate is herein called a light utilization rate for brevity of description. Although a half of the orthogonal component is reflected in the main beam splitter 15, only a quarter of the orthogonal component reaches the signal producing circuit 17 through the auxiliary beam splitter 16. As a consequence, the servo control often becomes insufficient.

Figure 2:
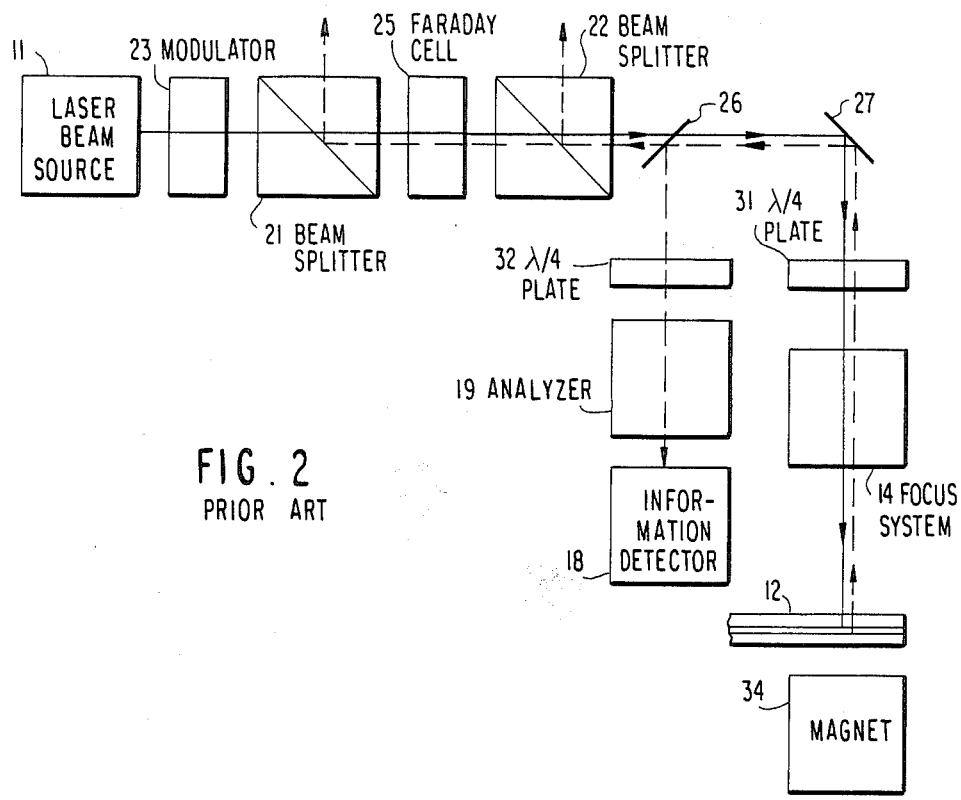
FIG. 2 is a like view of an improved magneto-optical recording and reproducing head.

Turning to FIG. 2, an improved magneto-optical recording and reproducing head is revealed in the above-referenced Japanese patent prepublication by two of six contributors of the Deguchi et al article cited heretobefore. The improved head comprises similar parts designated by like reference numerals.

Instead of the main beam splitter 15 (FIG. 1), first and second beam splitters 21 and 22 are interposed between the laser beam source 11 and the focussing system 14 along the trunk light path. For use in recording information on the recording medium 12, a modulator 23 precedes the first beam splitter 21 for use in modulating the forward laser beam generated by the laser beam source 11, which is a gas laser. Between the first and the second beam splitters 21 and 22, a Faraday effect member 25 is used as the afore-mentioned second arrangement for giving a Faraday rotation of 45° to the forward laser beam during passage therethrough. The splitting plane of the second beam splitter 22 is therefore azimuthally oriented in a direction which is 45° different from the splitting plane of the first beam splitter 21 although depicted parallel merely for simplicity of illustration. The Faraday effect member 25 may be a Faraday cell or an optical isolator.

Having forwardly passed through the second beam splitter 22, the forward laser beam partly passes through a half-silvered mirror 26, is deflected 90° by a substantially totally reflecting mirror 27, and is directed to the focussing system 14 through a first quarter-wave plate 31. For use in reproducing the information recorded on the recording medium 12, the reversed laser beam passes reversedly through the focussing system 14 and then the quarter-wave plate 31 and is 90° deflected by the totally reflecting mirror 27 to reversedly proceed along the trunk light path. A portion of the reversed laser beam is further 90° deflected by the half-silvered mirror 26 into a side beam portion which proceeds along a side light path similar to the above-defined branch light path. The side beam portion passes through a second quarter-wave plate 32 and then the analyser 19 and is received by the information detector 18.

Another portion of the reversed laser beam reversedly passes through the half-silvered mirror 26 and the trunk light path as a trunk beam portion. The s-polarized component of the trunk beam portion is substantially totally reflected in the second beam splitter 22.

Merely for convenience of illustration, the totally reflected portion of the trunk beam portion is depicted upwardly of the figure by a short dashed line. The p-polarized component of the trunk beam portion reversedly passes through the second beam splitter 22 as a continuation of the trunk beam portion or of the reversed laser beam.

Having reversedly passed through the second beam splitter 22 in this manner, the reversed laser beam is reversedly incident on the Faraday effect member 25 and is subjected to the Faraday rotation of 45° during passage therethrough. It is to be noted here that the Faraday rotation has a sense of rotation dependent on a magnetic field in the member 25. The reversed laser beam having reversedly passed through the Faraday effect member 25, therefore has a polarization plane which has a 90° difference or azimuthal displacement relative to a polarization plane of the forward laser beam incident on the member 25.

Having reversedly passed through the Faraday effect member 25, the reversed laser beam reversedly enters the first beam splitter 21 as the s-polarized component. The reversed laser beam is therefore substantially totally reflected in the manner indicated by a short vertical dashed line. The reversed laser beam is thereby prevented from returning to the laser beam source 11. According to the prepublication, a high signal-to-noise ratio is achieved by adjusting azimuthal orientations of the quarter-wave plates 31 and 32 and of the analyser 19.

On recording information, the modulator 23 is used together with a magnetic field produced in a sense of direction normal to the recording medium 12 and at the point of incidence of the forward laser beam by a magnet 34 which is depicted behind the recording medium 12 for simplicity of illustration. When the laser beam source 11 is a semiconductor laser, it is possible to dispense with the modulator 23. On erasing the information, the sense of the magnetic field is reversed in the recording medium 12. Incidentally, the p-polarized and the s-polarized components in the first and the second beam splitters 21 and 22 are herein called first p-polarized and s-polarized components and second p-polarized and s-polarized components. Transmissivities for the first and the second p-polarized components are called first and second transmissivities.

The first and the second transmissivities are not discussed at all in the prepublication. Irrespective of the transmissivities, the half-silvered mirror 26 deteriorates the light utilization rate. This is also the case when the signal detector 18 responds to a portion of the reversed laser beam reflected in the second beam splitter 22. The signal producing circuit 17 (FIG. 1) is not described in the prepublication with reference to the drawing. It may well be presumed that such a signal producing circuit responds either to the side or the branch beam portion. The control signal is therefore only insufficiently strong.

Referring now to FIG. 3, a magneto-optical reproducing head according to a preferred embodiment of this invention comprises similar parts which are again designated by like reference numerals. The first transmissivity is substantially equal to unity as before. In contrast, the second transmissivity should be greater than 0.5. Being different from the conventional head illustrated with reference to FIG. 1, the signal producing circuit 17 is made to respond to a portion of the reversed laser beam which is reflected in the first beam splitter 21 to proceed along a first branch light path as a first branch beam portion. Like in the conventional head, the signal detector 18 is coupled to a portion of the reversed laser beam which is reflected in the second beam splitter 22 to proceed along a second branch light path as a second branch beam portion.

Instead of the Faraday effect member 25 alone, a combination of the Faraday effect member 25 and an optically active member 35, such as a half-wave plate, is used as the above-defined second arrangement between the first and the second beam splitters 21 and 22 along the trunk light path. In the example being illustrated, the Faraday effect member 25 and the optically active member 35 are nearer to the first and the second beam splitters 21 and 22, respectively.

In the manner which will presently be described in detail, the optically active member 35 gives a forward rotation of 45° to the forward laser beam having forwardly passed therethrough, in relation to the forward laser beam forwardly incident thereon. In contrast to the Faraday effect member 25, the optically active member 35 gives a backward rotation of 45° to the reversed laser beam having reversedly passed therethrough, relative to the reversed laser beam reversedly incident thereon.

It is preferred that the forward 45° rotation should direct the polarization plane of the forward laser beam passed through the optically active member 35, parallel to the polarization plane of the forward laser beam forwardly incident on the Faraday effect member 25. In this event, it is possible to azimuthally orient the splitting planes of the first and the second beam splitters 21 and 22 parallel to each other and to render the first and the second p-polarized or s-polarized components also parallel to each other. It is furthermore possible with this to arrange the first and the second branch light paths on a single plane which includes the trunk light path. In other words, it is possible to render the trunk light path, the signal producing circuit 17, and the information detector 18 coplanar.

Referring additionally to FIG. 4 in which the polarization planes of the forward and the reversed laser beams are depicted with reference to a common polarization plane of the first and the second p-polarized components of an azimuthal direction indicated at P, the first and the second s-polarized components have another common polarization plane of an azimuthal direction of S. It may be understood that the polarization planes of the forward and the reversed laser beams are illustrated when seen in that one of two senses of direction in which the forward and the reversed laser beams goes away and approaches, respectively.

In FIG. 4, it is assumed that the forward laser beam having forwardly passed through the first beam splitter 21, has the polarization plane depicted at A which reference letter is also labelled in FIG. 3. The laser beam may not necessarily be generated by the laser beam source 11 to have a polarization plane parallel to that of the first p-polarized component. Even in a case where the forward laser beam does not enter the first beam splitter 21 as the first p-polarized component, the forward laser beam has the polarization plane shown at A after having forwardly passed through the first beam splitter 21. The forward laser beam having passed through the Faraday effect member 25, has the polarization plane illustrated at B. When the optically active member 35 gives the forward 45° rotation in the manner described above, the forward laser beam has the polarization plane depicted at C after having passed through the optically active member 35. The forward laser beam falls on the recording medium 12 through the second beam splitter 22 and then the focussing system 14 with the polarization plane kept in the azimuthal direction illustrated at C.

On reversedly entering the second beam splitter 22 through the focussing system 14, the reversed laser beam has the polarization plane subjected to the Kerr rotation angle $\phi$ in the manner exaggeratedly shown at D. The information component has the polarization plane parallel to the direction S. The orthogonal component has the polarization plane in the direction P. The information component and a portion of the orthogonal component are 90° deflected by the second beam splitter 22 into the second branch beam path. Another portion of the orthogonal component reversedly passes through the second beam splitter 22 as a trunk beam portion having the polarization plane depicted at E. Having reversedly passed through the optically active member 35, the trunk beam portion has the polarization plane illustrated at F. Having reversedly passed through the Faraday effect member 25, the trunk beam portion has the polarization plane illustrated at G. The trunk beam portion is therefore substantially totally reflected in the first beam splitter 21 into the first branch beam path.

It is now clearly understood that the 90° difference is produced between the polarization plane of the forward laser beam forwardly incident on the Faraday effect member 25 and the polarization plane of the reversed laser beam which has reversedly passed through the Faraday effect member 25 and that the reversed laser beam is substantially prevented from reversedly passing through the first beam splitter 21. It is thereby possible to suppress return of the reversed laser beam to the laser beam source 11. In contrast to the improved head illustrated with reference to FIG. 2, the reversed laser beam is substantially wholly used in the signal producing circuit 17 and the information detector 18.

Referring afresh to FIG. 5 and again to FIG. 1, the forward laser beam has the polarization plane and an intensity depicted at A' (also in FIG. 1) on forwardly irradiating the recording medium 12 through the main beam splitter 15 and the focussing system 14. On reversedly entering the main beam splitter 15 through the focussing system 14, the reversed laser beam has the polarization plane and an intensity illustrated at B'. In the main beam splitter 15, substantially whole of the information component and a half of the orthogonal component are reflected. The branch beam portion therefore has the polarization plane and an intensity shown at C'. In the auxiliary beam splitter 16, substantially whole of the information component and a half of the orthogonal component of the branch beam portion are reflected. The twig beam part has the polarization plane and an intensity depicted at D'. It is to be noted that the orthogonal component of the twig beam part is a quarter of the orthogonal component reversedly incident on the main beam splitter 15 when the main and the auxiliary beam splitters 15 and 16 have a common transmissivity of 0.5 for the p-polarized component. In the manner already pointed out in the above-cited Deguchi et al article, the Kerr rotation angle $\phi$ is increased in the twig beam part. The increased Kerr rotation angle will be called a degree of modulation.

It is now understood by comparison of the head illustrated with reference to FIG. 3 with that of FIG. 1 that the same amount of light is received by the information detector 18 with the same degree of modulation when the second transmissivity is equal to 0.25. In this case, the second beam splitter 22 has a reflectivity of 0.75 for the p-polarized component, namely, for the orthogonal component reversedly entering the second beam splitter 22. The light utilization rate is therefore appreciably raised.

Having reversedly entered the main or the second beam splitter 15 or 22, the information component is substantially totally reflected. In the conventional head, the information component is again substantially totally reflected in the auxiliary beam splitter 16. In the second branch beam portion, the orthogonal component is a quarter of the orthogonal component reversedly incident on the second beam splitter 22. The orthogonal component of the branch beam part is also a quarter of the orthogonal component reversedly incident on the main beam splitter 15. The same signal-to-noise ratio is therefore attained if the reversed laser beam were prevented from returing to the laser beam source 11 also in the conventional head.

In the manner described above, the branch beam part is about a quarter of the reversed laser beam which reversedly enters the main beam splitter 15. In marked contrast, the first branch beam portion is about 0.75 of the reversed laser beam which reversedly enters the second beam splitter 22 to reversedly pass therethrough and is substantially totally reflected in the first beam splitter 21. The first branch beam portion is therefore about three times as strong as the branch beam part. As a consequence, it is possible with the head of FIG. 3 to obtain a sufficiently strong control signal.

It has been confirmed that the second transmissivity should preferably be greater than 0.5 and not greater than 0.9. More preferably, the second transmissivity should not be less than 0.75 in the manner described before and should not be greater than 0.8. It is readily possible in the known manner to select a beam splitter of a desired transmissivity for the p-polarized component as each of the first and the second beam splitters 21 and 22. Such a beam splitter may comprise a plurality of dielectric layers. Examples of the dielectrics are cryolite ($Na_3AlF_6$), aluminium oxide ($Al_2O_3$), quartz ($SiO_2$), zinc sulfide, zinc oxide, and titanium dioxide. Each dielectric layer has a thickness of a quarter wavelength. The transmissivity is adjusted by selecting the number of layers. For example, the number is about twenty.

In the manner exemplified in FIG. 5, the forward laser beam is appreciably stronger than the reversed laser beam. The beam power per unit area is, however, not so strong between the collimeter and the focussing systems 13 and 14 even for the forward laser beam. No problem therefore arises in each beam splitter even if the beam splitter is implemented by Glan-Thompson prism.

While this invention has thus far been described in conjunction with only a single preferred embodiment thereof, it will now readily be possible for one skilled in the art to develop various other embodiments of this invention. For example, the forward 45° rotation may orient the polarization plane of the forward laser beam having forwardly passed through the optically active member, orthogonal to the p-polarized component of the second beam splitter 22. The Faraday effect and the optically active members 25 and 35 may be nearer to the second and the first beam splitters 22 and 21, respectively. As in the improved head illustrated with reference to FIG. 2, the trunk light path may not be rectilinear. The "reversed" laser beam may be the laser beam which has passed through the recording medium 12. In the manner remarked hereinabove and described in connection with FIG. 2, it is possible to use the head of FIG. 3 in recording information on the recording medium 12 and/or in erasing the information.

What is claimed is:

1. In a magneto-optical reproducing head for use in a magneto-optical reproducing device together with a laser beam source and a magneto-optical recording medium, said head including a first and a second beam splitter along a light path and first means for causing a forward laser beam to forwardly proceed along said light path from said laser beam source to said recording medium and for causing a reversed laser beam to reversedly proceed partly along said light path from said recording medium, said reversed laser beam comprising an information and an orthogonal component having polarization planes perpendicular and parallel to a polarization plane which said forward laser beam has at said recording medium, respectively, said first beam splitter having a first transmissivity for a first p-polarized component, substantially totally reflecting a first s-polarized component, and being oriented to make said forward laser beam pass therethrough as said first p-polarized component, said second beam splitter having a second transmissivity for a second p-polarized component, substantially totally reflecting a second s-polarized component, and being oriented to reflect said information component as said second s-polarized component and to make said orthogonal component reversedly pass therethrough as said second p-polarized component, said first transmissivity being substantially equal to unity, said head further including information detecting means responsive to the information component reflected in said second beam splitter for detecting information recorded on said recording medium and second means between said first and said second beam splitters for giving a 90° difference between polarization planes of the forward laser beam incident thereon and of the orthogonal component having reversedly passed therethrough to make said forward laser beam forwardly pass through said second beam splitter as said second p-polarized component and to make said orthogonal component reversedly enter said first beam splitter as said first s-polarized component, the improvement wherein said second transmissivity is greater than 0.5 and said head comprising signal producing means responsive to the orthogonal component reflected in said first beam splitter for producing a control signal for use in servo controlling said magneto-optical reproducing device.

2. A head as claimed in claim 1, wherein said second transmissivity is greater than 0.5 and not greater than 0.9.

3. A head as claimed in claim 2, wherein said second transmissivity is not less than 0.75 and not greater than 0.8.

4. A head as claimed in claim 1, wherein said second means comprises a Faraday effect member for giving said 90° difference between the polarization planes of the forward laser beam incident thereon and of the orthogonal component having reversedly passed therethrough and an optically active member for giving a forward 45° rotation to a polarization plane of the forward laser beam forwardly incident thereon and a backward 45° rotation to a polarization plane of the orthogonal component reversedly incident thereon.

5. A head as claimed in claim 4, wherein said Faraday effect and said optically active members are near said first and said second beam splitters, respectively.

6. A head as claimed in claim 4, wherein said Faraday effect and said optically active members are near said second and said first beam splitters, respectively.

* * * * *

UNITED STATES PATENT AND TRADEMARK OFFICE
CERTIFICATE OF CORRECTION

PATENT NO. : 4,729,122

DATED : March 1, 1988

INVENTOR(S) : Itoh

It is certified that error appears in the above-identified patent and that said Letters Patent is hereby corrected as shown below:

COLUMN 2, LINE 2   Delete "threrethrough" and insert --therethrough--;

COLUMN 3, LINE 43  Delete "reprocing" and insert --reproducing--.

Signed and Sealed this

Sixth Day of September, 1988

Attest:

DONALD J. QUIGG

Attesting Officer

Commissioner of Patents and Trademarks